United States Patent
Dobbs et al.

(10) Patent No.: US 7,009,705 B1
(45) Date of Patent: Mar. 7, 2006

(54) ACTIVE REMOTE SENSING USING LOCK-IN AMPLIFIERS AND BEAM STEERING

(75) Inventors: Michael E. Dobbs, Fort Wayne, IN (US); Allan Roberts, Penrose, NC (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 420 days.

(21) Appl. No.: 10/197,247

(22) Filed: Jul. 18, 2002

(51) Int. Cl.
*G01N 21/55* (2006.01)

(52) U.S. Cl. ..................................... 356/445
(58) Field of Classification Search ................. 356/445
See application file for complete search history.

(56) References Cited

U.S. PATENT DOCUMENTS

| | | | |
|---|---|---|---|
| 3,489,495 A | 1/1970 | Blau et al. | |
| 4,529,317 A | 7/1985 | Cramp | |
| 5,061,075 A * | 10/1991 | Alfano et al. | 356/417 |
| 5,184,241 A * | 2/1993 | Schwemmer | 398/93 |
| 5,502,558 A * | 3/1996 | Menders et al. | 356/28.5 |
| 5,564,830 A * | 10/1996 | Bobel et al. | 374/126 |
| 5,751,830 A | 5/1998 | Hutchinson | 382/103 |
| 6,141,094 A | 10/2000 | Tong | 356/300 |
| 6,151,522 A | 11/2000 | Alfano et al. | 600/473 |
| 6,329,661 B1 | 12/2001 | Perov et al. | |
| 2003/0157242 A1 * | 8/2003 | Nakano et al. | 427/8 |

OTHER PUBLICATIONS

Experiment 8., "Lock-In Detection of Laser Induced Fluorescence", http://www.chem.brown.edu/chem116/labs/exp8.html, print date Jul. 5, 2002, 5 pages.
Application Note #3, "About Lock-In Amplifiers", 2000 Stanford Research Systems, Inc., pp. 145-155.
"SR540 Applications Notes", 2000 Stanford Research Systems, Inc., 2 pages.
"SR830 and SR810 DSP Lock-In Amplifiers", 2000 Stanford Research Systems, Inc., 3 pages.

* cited by examiner

*Primary Examiner*—Layla G. Lauchman
*Assistant Examiner*—Gordon J. Stock, Jr.
(74) *Attorney, Agent, or Firm*—RatnerPrestia

(57) ABSTRACT

A remote sensing platform for sensing a target may include a source configured to emit optical radiation toward the target. A device may be configured to dither the emitted optical radiation to alternately illuminate a number of locations on the target. A first detector may be configured to detect radiation reflected from a first location of the number of locations and to generate a first signal. A first lock-in amplifier may be configured to process the first signal. A second detector may be configured to detect radiation reflected from a second location of the number of locations and to generate a second signal. A second lock-in amplifier may be configured to process the second signal.

21 Claims, 7 Drawing Sheets

ACTIVE REMOTE SENSING USING LOCK-IN AMPLIFIERS AND BEAM STEERING

BACKGROUND OF THE INVENTION

1. Field of the Invention

This invention relates to remote sensing and, more particularly, to active remote sensing.

2. Description of Related Art

Active remote sensing may be conceptualized as viewing radiation reflected and/or emitted from a certain location in one or more wavelength regions. Active multispectral remote sensing utilizes a source of radiation (e.g., infrared, visible, or ultraviolet light) to illuminate a target while measuring the reflected and/or emitted radiation at one or more detectors.

One scheme for performing active remote sensing is to stare at a location with a single detector while illuminating the location with one or more wavelengths of radiation. Various sources of noise, however, may lower the signal-to-noise ratio (SNR) of the measurement. Examples of such noise typically present in active remote sensing include solar background radiation and 1/f noise (i.e., noise whose power varies inversely with frequency).

Thus, there is a need in the art to perform active remote sensing from a remote platform while maintaining a high SNR.

SUMMARY OF THE INVENTION

Systems and processes consistent with the principles of the invention may include, among other things, a lock-in amplifier to improve the SNR of remotely measured radiation. A beam steering device may generate at least two chopped beams, and at least two lock-in amplifiers may be used to process the chopped beams.

In accordance with one purpose of the invention as embodied and broadly described herein, a remote sensing platform for sensing a target may include a source configured to emit optical radiation toward the target. A device may be configured to dither the emitted optical radiation to alternately illuminate a number of locations on the target. A first detector may be configured to detect radiation reflected from a first location of the number of locations and to generate a first signal. A first lock-in amplifier may be configured to process the first signal. A second detector may be configured to detect radiation reflected from a second location of the number of locations and to generate a second signal. A second lock-in amplifier may be configured to process the second signal.

In another implementation consistent with principles of the invention, a method of remotely sensing a target may include emitting a beam of optical radiation and deflecting the beam of optical radiation so that the optical radiation is alternately directed at a number of different locations on the target. First radiation from one of the number of locations on the target may be detected using a phase sensitive technique, and second radiation from another of the number of locations on the target may be detected using the phase sensitive technique.

In a further implementation consistent with principles of the invention, a system for remotely sensing a target may include a source configured to emit optical radiation and an amplifier configured to amplify the optical radiation emitted by the source to produce an amplified signal. A beam steering device may be configured to redirect the amplified signal at a predetermined frequency and transmit at least one chopped signal toward the target. A first detecting unit may be configured to detect first radiation from the at least one chopped signal and generate a first detection signal based on the predetermined frequency of the beam steering device. The beam steering device also may be configured to transmit substantially all power in the amplified signal toward the target.

In a yet another implementation consistent with principles of the invention, a method of remotely sensing a target may include emitting a beam of optical radiation and steering the beam of optical radiation to transmit at least one chopped signal toward at least one location on the target. The at least one chopped signal may include substantially all optical radiation in the beam of optical radiation. A reference signal corresponding to a frequency of the at least one chopped signal may be generated. First radiation from a first chopped signal of the at least one chopped signal may be detected using a phase sensitive technique and the reference signal.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, in one implementation consistent with the principles of the invention, a remote sensing platform may include a lock-in amplifier to improve the SNR of remotely measured radiation. A beam steering device may generate two chopped beams, and two lock-in amplifiers may be used to increase SNR while maintaining a level of energy utilization of a signal output by an optical amplifier.

Exemplary System

Figure 1:
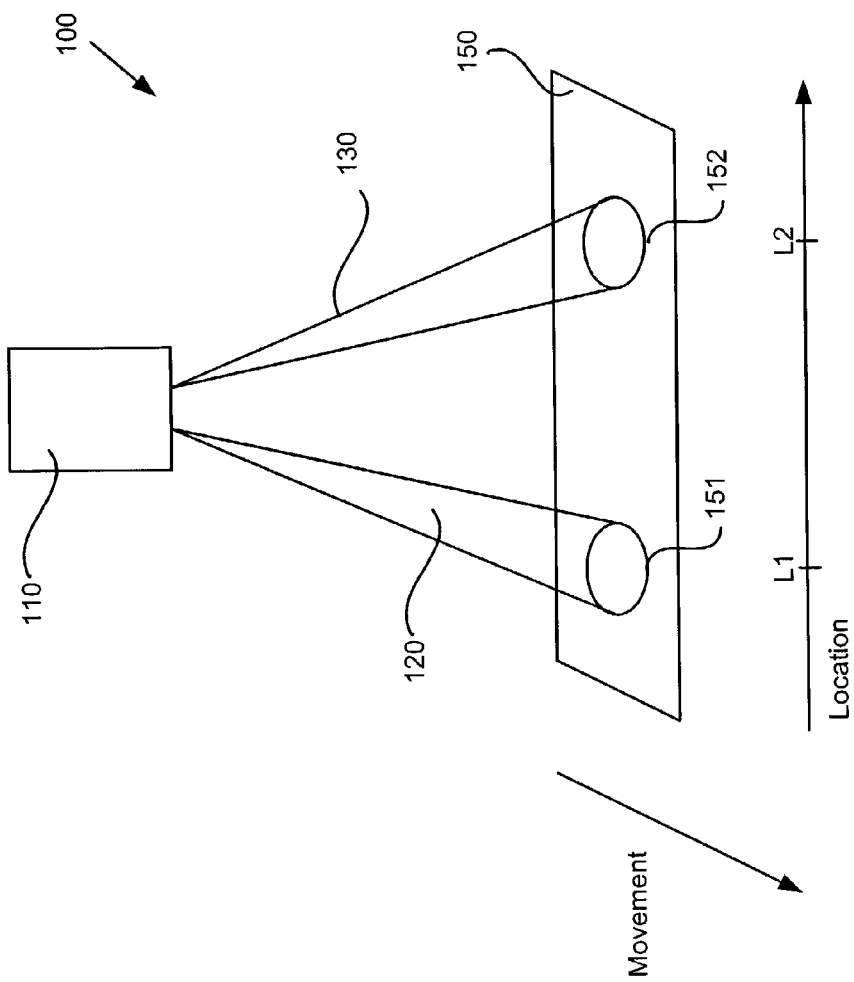
FIG. 1 is a schematic diagram of an active multispectral remote sensing system according to an implementation consistent with the principles of the invention.

FIG. 1 is a schematic diagram of an active remote sensing system 100 according to an implementation consistent with the principles of the invention. The system 100 may include a remote sensing platform 110 and a target 150. The remote sensing platform 110 may emit one or more beams of radiation 120/130, which may illuminate different portions 151/152 of the target 150.

The remote sensing platform 110 (or simply "platform") may include a satellite, an airplane, a helicopter, an unmanned aerial vehicle (UAV), a boom mounted on a vehicle, or any other platform that may orient an active sensor an operational distance from the target 150. In a typical implementation, the platform 110 may be configured to move relative to a stationary target 150, for example, an orbiting motion of a satellite, or a translating motion of an aircraft. One possible implementation may include a stationary platform 110 and a moving target 150, which still produces relative motion between the platform 110 and the target 150. Another implementation may include a stationary platform 110 that changes its field of view (FOV) using, for example, a scanning mirror. In such an implementation, the change in FOV produces apparent movement relative to the platform 110. Further exemplary details of the platform 110 will be discussed below with respect to FIGS. 2 and 3.

The platform 110 may be configured to emit and detect one or more beams of radiation 120/130. Although two beams 120 and 130 are shown in FIG. 1, this number is purely for ease of explanation, and more (e.g., 140, etc.) or fewer beams of radiation may be generated and detected by the platform 110. Also for ease of explanation, beams 120/130 will be described as having the same wavelength. Each beam need not, but may, have a distinct wavelength from the other beams. In one implementation consistent with the principles of the invention, at least two beams have different wavelengths. The wavelengths of the emitted radiation may fall in the ultraviolet, visible, short-wavelength infrared (SWIR), mid-wavelength infrared (MWIR), long-wavelength infrared (LWIR), or any other electromagnetic region suitable for active remote sensing.

The target 150 may include a solid surface (e.g., the ground), objects (e.g., vehicles), vegetation, chemicals, gas/aerosol, or any other typical target of active remote sensing that has spectral features capable of multispectral measurement. Those skilled in the active remote sensing arts will appreciate various schemes for measuring absorption or differential absorption of target 150 from detected radiation. Accordingly, the specifics of generating spectra from detected radiation will not be further discussed.

As the platform 110 moves, different portions of the target 150 will be illuminated by the emitted radiation. For example, at the time shown in FIG. 1, a first portion 151 is illuminated by beam 120, and a second portion 152 is illuminated by beam 130. For later reference in the application, portions of the target 151/152 may be described as respectively corresponding to locations L1/L2 shown in FIG. 1.

Exemplary Platform

Figure 2:
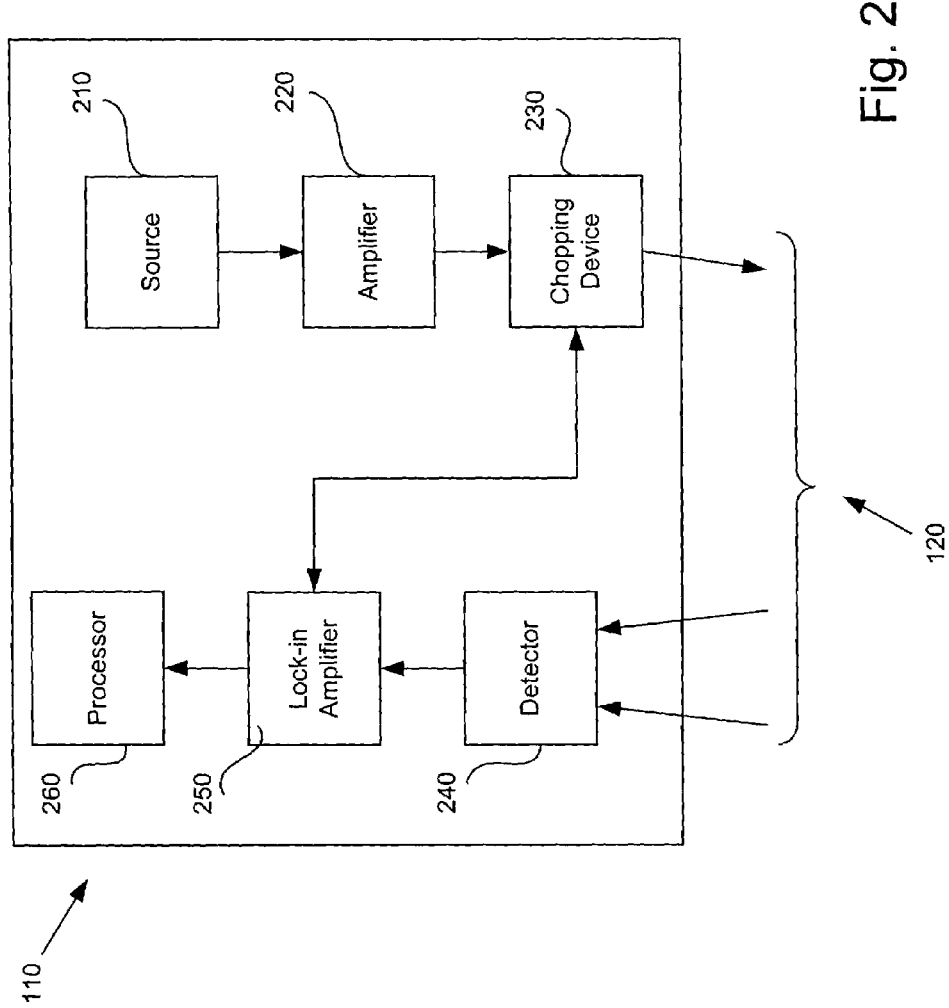
FIG. 2 is an exemplary implementation of a remote sensing platform of FIG. 1 shown in greater detail.

FIG. 2 is an exemplary implementation of the remote sensing platform 110 shown in greater detail. The platform 110 may include a radiation source 210, an amplifier 220, a chopping device 230, a detector 240, a lock-in amplifier 250, and a storage/processing unit 260. The optical arrangement illustrated in FIG. 2 is solely for ease of explanation, and should not be construed as limiting possible optical configurations. For example, separate optics or common optics could be used for the chopping device 230 and the detector 240.

Source 210 may include a laser or other radiation source that is configured to emit radiation of a first wavelength (i.e., beam 120). The laser in source 210 may be a pulsed or continuous wave (CW) laser transmitter. Although not shown, source 210 may include a distributed feedback (DFB) wavelength stabilization apparatus. Optics (not shown) may be configured to direct the emitted radiation to the amplifier 220.

Amplifier 220 may be configured to amplify the radiation emitted by the source 210. In one implementation consistent with the principles of the invention, the amplifier 220 may include an erbium-doped fiber amplifier (EDFA) or similar optical amplifier. Although not shown, amplifier 220 may also include one or more of an amplifier control circuitry and a beam expander. Those skilled in the art will recognize that various combinations of optical components may be used within source 210 and amplifier 220 to achieve desired properties of the emitted radiation.

Chopping device 230 may be configured to "chop" on and off the amplified radiation from the amplifier 220. The chopping device 230 may be controlled (either internally or by lock-in amplifier 250) to chop (i.e., obstruct the radiation from amplifier 220) at a known frequency and phase (e.g., a 50% duty cycle). The chopping device 230 may be configured to provide an external reference signal that reflects its chopping frequency and phase. In one implementation consistent with the principles of the invention, the chopping device may include a slitted chopper wheel or other type of optical switch apparent to those skilled in the art that is capable of chopping an optical signal. In one implementation consistent with the principles of the invention, the chopping device 230 may chop the detected signal at a rate above (e.g., 10 times faster) than a desired information rate (e.g., a 0.25 second integration time).

Detector 240 shares an FOV with the source 210 (and chopping device 230), and detects radiation that returns from the first portion 151 of the target 150 (i.e., location L1). The detector 240 may be configured to convert detected radiation into an electrical signal (e.g., via a photodetector). Although not shown, detector 240 may also include one or more of an analog-to-digital converter that digitizes the electrical signal and other signal processing circuitry. In one implementation consistent with the principles of the invention, the detector 240 may digitize the detected signal at a rate above (e.g., 10 times faster) than a desired information rate (e.g., a 0.25 second integration time). Those skilled in the art will recognize that various combinations of components may be used within the detector 240 to suitably process the detected radiation.

Lock-in amplifier 250 may be configured to receive a signal from the detector 240 and perform "phase-sensitive" detection upon the signal using a reference signal from the chopping device 230. Those skilled in the electrical arts will be familiar with the operation and construction of lock-in amplifiers (e.g., including tuned filters, mixers, phase shifters, and low pass filters, or similar functions in a digital signal processor (DSP)). In one implementation consistent with the principles of the invention, the lock-in amplifier 250 may operate on digital signals from the amplifier 220 via an internal DSP, and may be configured to receive a reference signal from the chopping device 230. The lock-in amplifier 250 also may be configured to control the chopping device 230.

As those skilled in the art will appreciate, the operational frequency of the lock-in amplifier 250 and the chopping device 230 may be selected high enough to significantly reduce 1/f noise that may be present in the radiation emitted by source 210. Further, a relatively narrow bandwidth about the operational frequency of the lock-in amplifier 250 may remove a significant amount of noise from other sources, such as solar background radiation. Hence, use of the lock-in amplifier 250 may significantly increase the SNR of the radiation detected by the detector 240.

The storage/processing unit 260 may include circuitry to read, format, and/or store data from lock-in amplifier 250. In one implementation consistent with the principles of the invention, the storage/processing unit 260 stores all data read from lock-in amplifier 250 for retrieval and processing at a later date. The unit 260 may include one or more shift registers in such an implementation. In other implementations, the unit 260 may process the data from the lock-in amplifier 250, rather than merely storing "raw" data. For example, the unit 260 may assemble multispectral signals for each location viewed, and/or the collected spectral data may be calibrated as is typically done in the remote sensing art. In other implementations, the storage/processing unit 260 may include a communication link (e.g., a wireless communication link) for transferring raw or processed data to a remote location.

Figure 3:
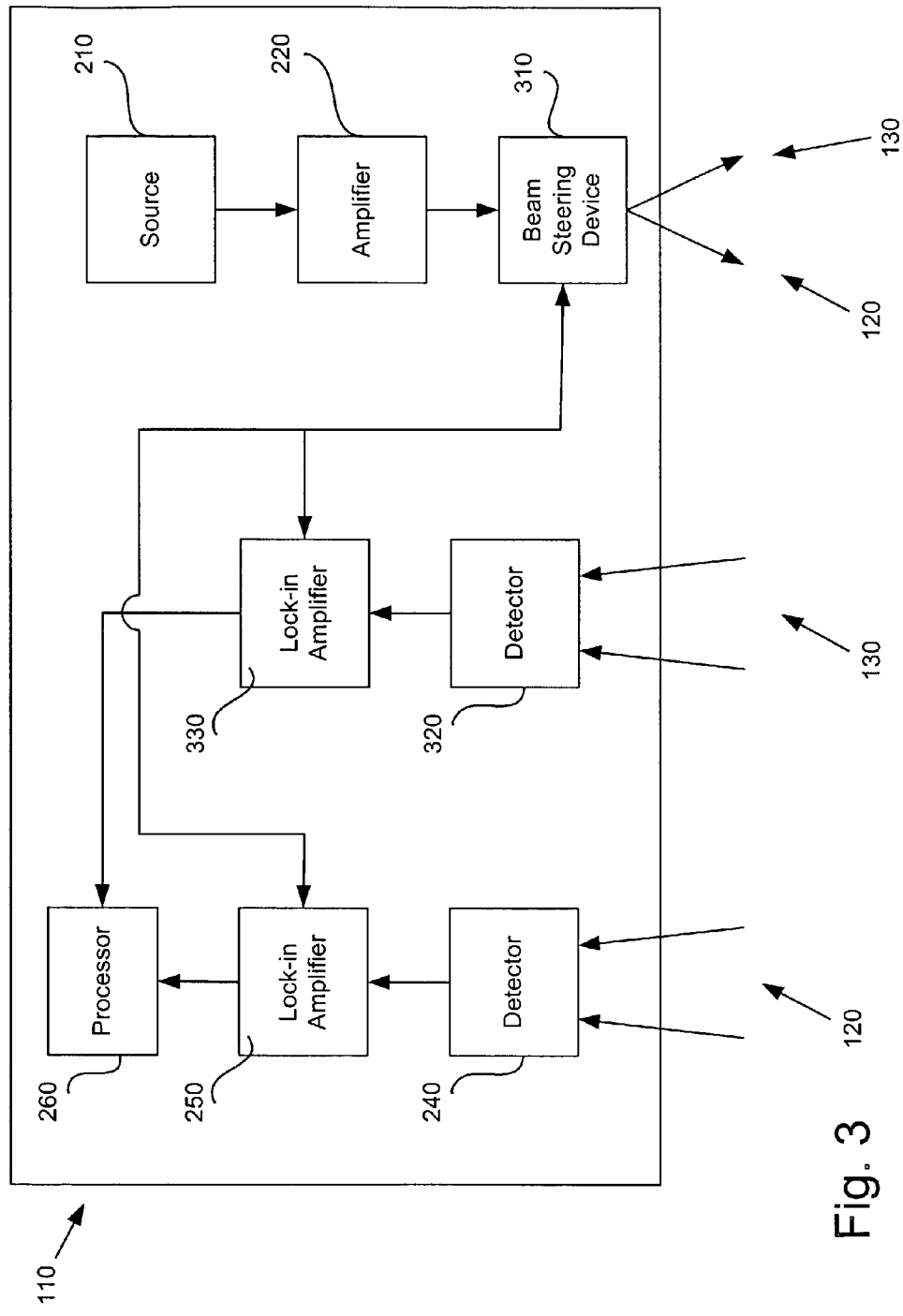
FIG. 3 is another exemplary implementation of a remote sensing platform of FIG. 1 shown in greater detail.

FIG. 3 is another exemplary implementation of the remote sensing platform 110 shown in greater detail. The platform 110 may include the elements 210, 220, and 240–260 shown in FIG. 2 (including the "first" detector 240 and "first" lock-in amplifier 250), as well as a beam steering device 310, a second detector 320, and a second lock-in amplifier 330. Elements 210, 220, and 240–260 operate as described above, and will not be further elaborated upon. Also, the second detector 320 and second lock-in amplifier 330 are configured to operate similarly to the first detector 240 and first lock-in amplifier 250.

The beam steering device 310 may be configured to "steer" or "dither" the radiation from the source 210, and amplifier 220 if present, into first and second emitted signals 120 and 130, each with a complementary phase. In one implementation consistent with the principles of the invention, the beam steering device 310 may include a dithering mirror or lens configured to direct radiation at alternating FOVs (e.g., corresponding to locations L1 and L2 in FIG. 1) with a frequency of operation. Those skilled in the art will appreciate various other optical devices that may be configured to "dither" a beam of optical radiation. In contrast to chopping device 230, beam steering device 310 is configured to emit all radiation from amplifier 220 from the platform 110 in the form of out-of-phase beams 120 and 130.

Figure 4:
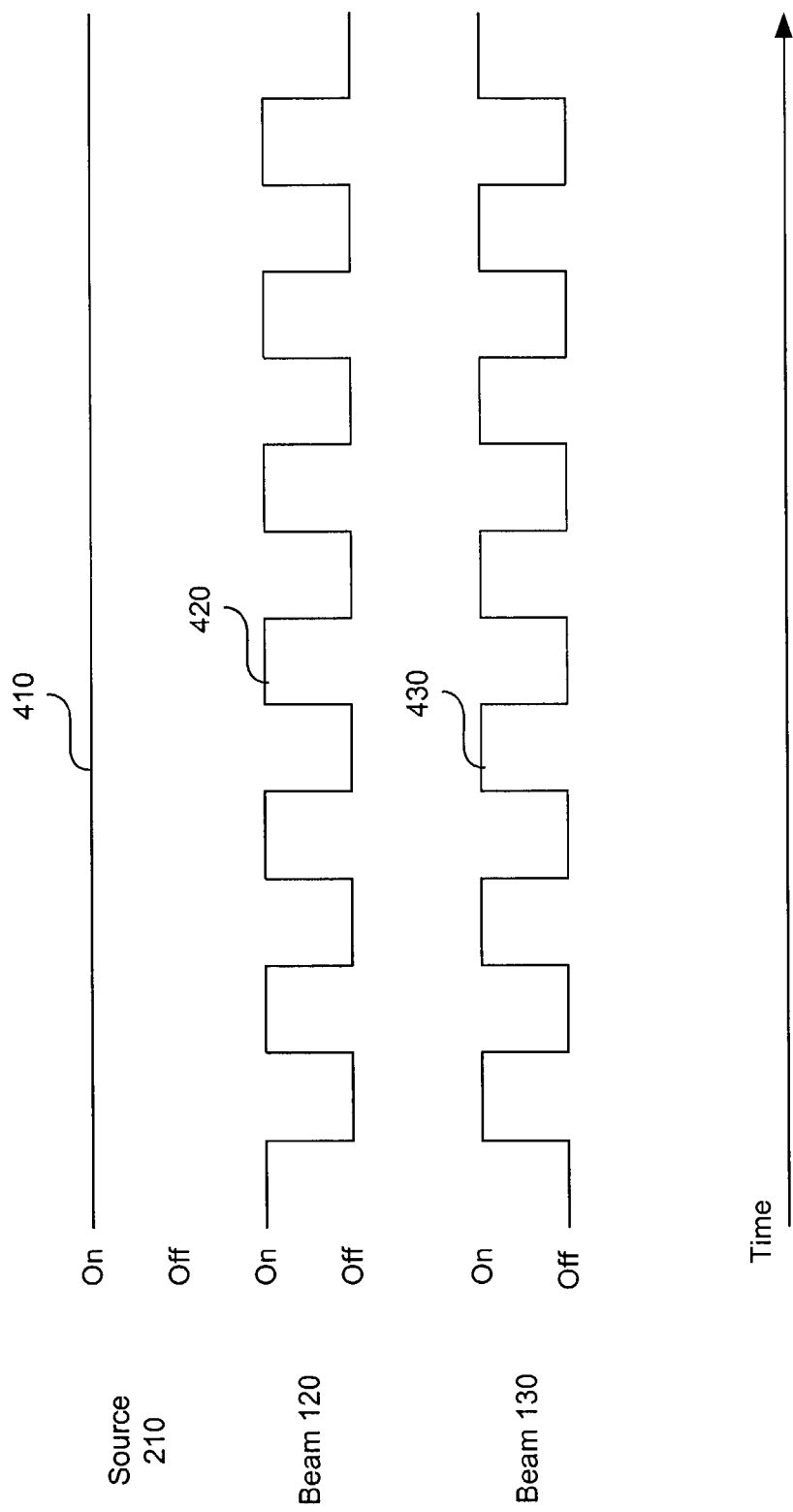
FIG. 4 is a diagram illustrating radiation emitted by elements in the platform of FIG. 3.

FIG. 4 is a diagram schematically illustrating radiation emitted by elements 210 and 310. Signal 410 represents a steady emission of amplified radiation from amplifier 220 to the beam steering device 310. Signals 420 and 430 collectively represent the alternately dithered (e.g., deflected) output of the beam steering device 310.

As shown in FIG. 4, for some percentage of the time (e.g., 50%), the beam steering device 310 (e.g., a dithering mirror) may periodically direct radiation along the first beam 120 in a first FOV. The beam steering device 310 may periodically (e.g., at the frequency needed for proper lock-in) re-direct radiation along the second beam 130 in a second FOV, leaving no radiation directed along beam 120. Such operation of beam steering device 310 produces two complementary, out of phase, "chopped" signals 420 and 430, while emitting all radiation from the amplifier 220 out of the platform 110. In this manner, beam steering device 310 achieves 100% greater utilization of the energy emitted by the source 210 than the chopping device 230.

Returning to FIG. 3, the first detector 240 and the first lock-in amplifier 250 are configured to detect and process radiation from the first beam 120. Similarly, the second detector 320 and the second lock-in amplifier 330 are configured to detect and process radiation from the second beam 130. Both of the lock-in amplifiers 250 and 330 may send data to the processor 260 for formatting, storage, etc. Both of the first and second lock-in amplifiers 250 and 330 also may use the same reference signal from the beam steering device 310. If necessary, one of the lock-in amplifiers 250/330 may use, for example, an inverter to change the phase of the reference signal to match that of its beam 120/130.

The particular configuration of the beam steering device 310 and corresponding detectors 240 and 320 is purely exemplary. For example, common optics could be used among the optical elements (e.g., elements 310, 240, and 320). In one implementation, separate optics may be used for the beam steering device 310, while common optics may be used for the detectors 240 and 320. Further, detectors 240 and 320 may be part of a detector array, and not separate, provided that these detectors can maintain separate FOVs. Those skilled in the remote sensing art will be able to choose a suitable optical arrangement consistent with the principles of the invention, but which need not be exactly as shown in FIG. 3.

Figure 5:
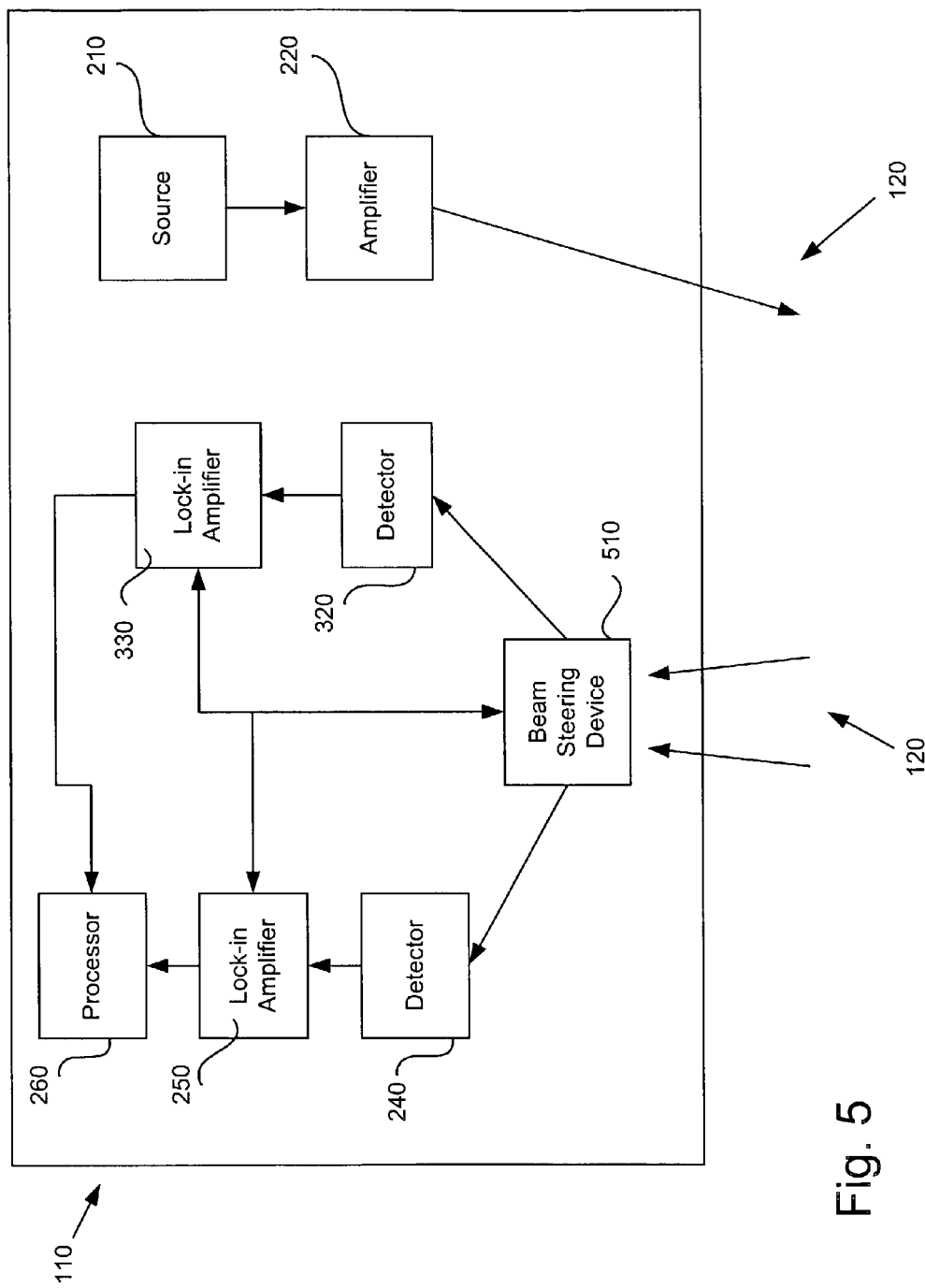
FIG. 5 is another exemplary implementation of a remote sensing platform of FIG. 1 shown in greater detail.

FIG. 5 is another exemplary implementation of the remote sensing platform 110 shown in greater detail. The platform 110 may include the elements 210, 220, 240–260, 320, and 330 shown in FIG. 3, as well as a beam steering device 510. Elements 240–260, 320, and 330 operate as described above, and will not be further elaborated upon.

The source 210 and amplifier 220 may be configured to direct a continuous beam of radiation 120 in a FOV (i.e., a location on the target 150). For the purposes of discussion, the location L1 may correspond to the FOV of the source 210 and amplifier 220.

The beam steering device 510 may be configured to "steer" or "dither" any reflected or emitted radiation from the location L1 (i.e., position 151) to first and second detectors 240 and 320. In one implementation consistent with the principles of the invention, the beam steering device 510 may include a dithering mirror or lens configured to direct radiation from a single FOV to the first and second detectors 240 and 320 with a frequency of operation. Those skilled in the art will appreciate various other optical devices that may be configured to "dither" a beam of optical radiation. Beam steering device 310 is configured to provide all radiation from location L1 to the detectors 240/320 in the form of out-of-phase, "chopped," optical signals (e.g., similar to signals 420 and 430 in FIG. 4).

The first detector 240 and the first lock-in amplifier 250, and the second detector 320 and the second lock-in amplifier 330, are respectively configured to detect and process radiation from the beam steering device 510. Both of the lock-in amplifiers 250 and 330 may send data to the processor 260 for formatting, storage, etc. Both of the first and second lock-in amplifiers 250 and 330 also may use the same reference signal from the beam steering device 510. If necessary, one of the lock-in amplifiers 250/330 may use, for example, an inverter to change the phase of the reference signal to match that of its input signal.

The particular configuration of the beam steering device 510 and corresponding detectors 240 and 320 is purely exemplary. For example, common optics could be used among the optical elements (e.g., elements 510, 240, and 320). Those skilled in the remote sensing art will be able to choose a suitable optical arrangement consistent with the principles of the invention, but which need not be exactly as shown in FIG. 5.

Process of Obtaining Data

Figure 6:
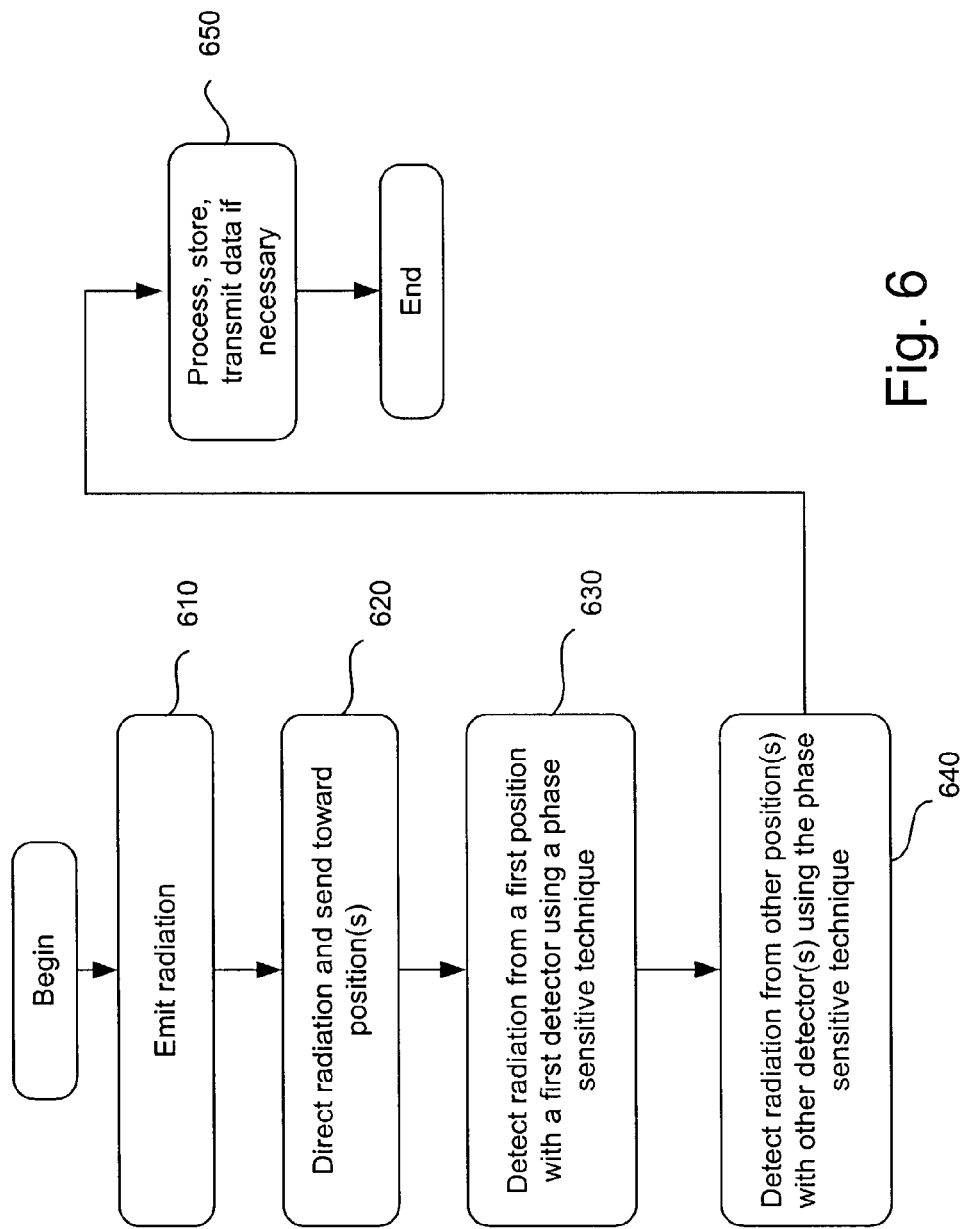
FIG. 6 is a flow chart illustrating a process of actively sensing one or more positions according to an implementation consistent with the present invention.

FIG. 6 is flow chart illustrating a process of actively sensing one or more positions (e.g., portion 151 of target 150 at location L1) according to an implementation consistent with the present invention. In practice, remote sensing data may be obtained on an ongoing/continual basis for a number of positions by a moving platform 110, but for clarity of explanation, FIG. 6 concentrates on data associated with a single platform orientation.

The process may begin with the source 210 in the platform 110 emitting radiation [act 610]. The emitted radiation may be optionally amplified by the amplifier 220.

The process may continue with a chopping/steering device (e.g., 230 or 310) directing the radiation emitted by the source 210 into one or more chopped signals (e.g., 120 and/or 130) that are emitted toward the target 150 [act 620]. As discussed above with respect to FIG. 2, the directing may result in a single beam 120 or 130 being emitted from the platform 110. In another implementation consistent with the principles of the invention, the beam steering may result in two or more beams (e.g., 120 and 130) being emitted from the platform 110, as illustrated, for example, in FIG. 3. In such an implementation, the beams (e.g., 120/130), if superposed, may sum to the radiation emitted by the source 210 (and amplifier 220).

The combination of the first detector 240 and the first lock-in amplifier 250 may detect radiation emitted or reflected from a first position 151 on the target 150 [act 630]. Because the lock-in amplifier 250 operates using a reference signal from the chopping/steering device (230 or 310) as is known by those skilled in the art, its detection may be referred to as "phase sensitive detection." This phase sensitive, lock-in technique may significantly increase the SNR of the detected radiation from the first position 151.

Optionally, the combination of the second detector 320 and the second lock-in amplifier 330 may detect radiation emitted or reflected from a second position 152 on the target 150 [act 640]. If the beam steering device 310 dithers the signal from the source 210, two or more beams or signals (e.g., 120 and 130) may be emitted from the platform 110. In such a case, the second detector 320 and the second lock-in amplifier 330 may be used to perform phase sensitive, lock-in detection for radiation from the second position 152.

Once data has been detected for the position(s), the detected data may be processed if necessary [act 650]. Such processing may include calibration of raw detected data, and/or image registration. The processed (or "raw") data may be stored on board the remote platform 110, or it may be transmitted to, for example, a ground station or satellite relay station associated with the platform 110.

Figure 7:
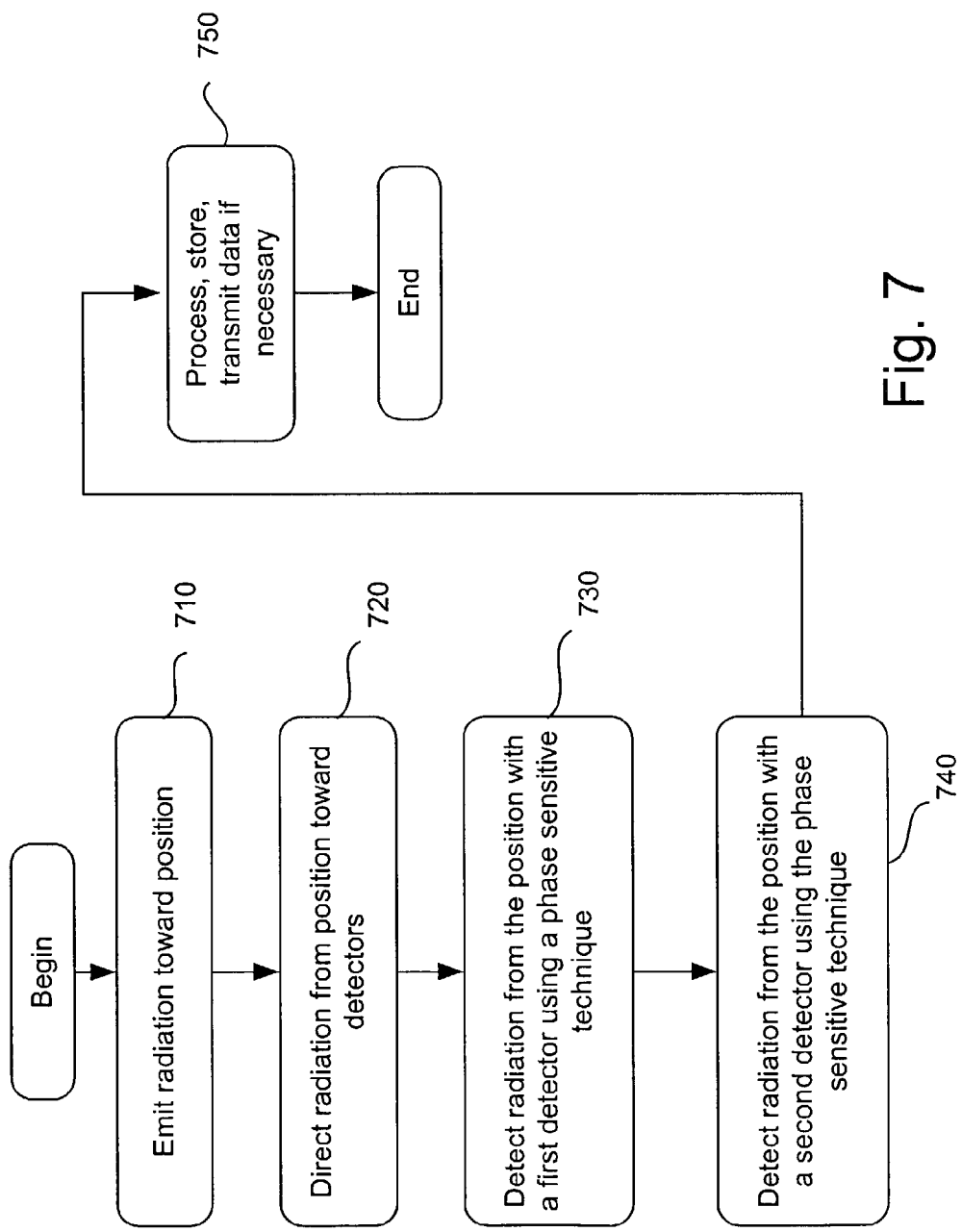
FIG. 7 is another flow chart illustrating a process of actively sensing one position according to the implementation of FIG. 5

FIG. 7 is flow chart illustrating a process of actively sensing one position (e.g., portion 151 of target 150 at location L1) according to an implementation consistent with the present invention. The process may begin with the source 210 in the platform 110 emitting radiation toward the location L1 [act 710]. The emitted radiation may be optionally amplified by the amplifier 220.

The process may continue with a beam steering device 510 directing the radiation emitted or reflected by the location L1 into a plurality of chopped signals that are directed toward a corresponding number of detectors [act 720]. The chopped signals, if superposed, may sum to the radiation emitted/reflected by the location L1.

The combination of the first detector 240 and the first lock-in amplifier 250 may detect one of the chopped signals from the beam steering device 510 [act 730]. Because the lock-in amplifier 250 operates using a reference signal from the steering device 510 as is known by those skilled in the art, its detection may be referred to as "phase sensitive detection." This phase sensitive, lock-in technique may significantly increase the SNR of the detected radiation from the location L1.

The combination of the second detector 320 and the second lock-in amplifier 330 also may detect another one of the chopped signals from the beam steering device 510 [act 740]. The second detector 320 and the second lock-in amplifier 330 may be used to perform phase sensitive, lock-in detection for radiation from the location L1.

Once data has been detected for the position(s), the detected data may be processed if necessary [act 750]. Such processing may include calibration of raw detected data, and/or image registration. The processed (or "raw") data may be stored on board the remote platform 110, or it may be transmitted to, for example, a ground station or satellite relay station associated with the platform 110.

CONCLUSION

Systems and methods consistent with the principles of the invention may use a lock-in amplifier to improve the SNR of remotely measured radiation. A beam steering device may generate at least two chopped beams, and at least two lock-in amplifiers may be used to process the chopped beams.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, "multispectral" data may be collected at two or more different wavelengths consistent with the principles of the invention. Further, it is specifically contemplated that "multispectral" may include tens to hundreds of wavelengths (i.e., hyperspectral), to thousands of different wavelengths (e.g., ultraspectral).

Also, although two lock-in amplifiers were described with respect to FIG. 3, more than two such detectors and amplifiers may be used to detect radiation from the same optical source 210. In such a case, the beam steering device 310 may be configured to dither/deflect the emitted radiation among three or more beams/FOVs. For example, each of the three beams may include the emitted radiation at a one-third duty cycle.

Further, although a beam steering device 310 has been described, those skilled in the art will appreciate that the source 210 (and perhaps the amplifier 220) may be discontinuously powered to generate a chopped signal. Techniques for "chopping" a source 210 exist, even if the source is, for example, a pumped CW laser. In such a case, the beam steering device 310 may be omitted or modified accordingly. Similarly, the detectors may be discontinuously operated (i.e., read at discontinuous intervals) to modify or eliminate the beam steering device 510.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed:

1. A remote sensing platform for sensing a target, comprising:
   a source disposed in an aircraft or satellite configured to emit optical radiation toward the target;
   a device configured to dither the emitted optical radiation to alternately illuminate a plurality of locations on the target;
   a first detector configured to detect radiation reflected from a first location of the plurality of locations and to generate a first signal;
   a first lock-in amplifier configured to process the first signal;
   a second detector configured to detect radiation reflected from a second location of the plurality of locations and to generate a second signal; and
   a second lock-in amplifier configured to process the second signal.

2. The platform of claim 1, wherein the source includes a cw laser, and the radiations reflected from the first and second locations are detected by the first and second detectors, respectively, as complementary, out-of-phase signals.

3. The platform of claim 1, further comprising:
   an optical amplifier arranged between the source and the device and configured to amplify the optical radiation emitted by the source.

4. The platform of claim 1, wherein the device includes a moveable mirror or a moveable lens.

5. The platform of claim 1, wherein the device is further configured to provide a reference signal to at least one of the first lock-in amplifier and the second lock-in amplifier.

6. The platform of claim 1, further comprising:
   a processing unit configured to further process data provided by the first lock-in amplifier and the second lock-in amplifier.

7. A method of remotely sensing a target, comprising:
   emitting a beam of optical radiation from a source disposed in an aircraft or satellite;
   deflecting the beam of optical radiation so that the optical radiation is alternately directed at a plurality of different locations on the target;
   detecting first radiation from one of the plurality of locations on the target using a phase sensitive technique; and
   detecting second radiation from another of the plurality of locations on the target using the phase sensitive technique.

8. The method of claim 7, further comprising:
   amplifying the beam of optical radiation before said deflecting,
   wherein the beam is emitted as a cw signal, and
   the first and second radiations are detected, respectively, as complementary, out-of-phase signals.

9. The method of claim 7, wherein the deflecting includes:
   generating a reference signal that corresponds to a frequency at which the optical radiation is alternately directed.

10. The method of claim 9, wherein the phase sensitive technique includes a lock-in technique that uses the reference signal.

11. The method of claim 7, further comprising:
    processing data provided by the detecting first radiation and the detecting second radiation.

12. A system for remotely sensing a target, comprising:
    a source configured to emit optical radiation;
    an amplifier configured to amplify the optical radiation emitted by the source to produce an amplified signal;
    a beam steering device configured to redirect the amplified signal at a predetermined frequency and transmit at least one chopped signal toward the target; and
    a first detecting unit configured to detect first radiation from the at least one chopped signal and generate a first detection signal based on the predetermined frequency of the beam steering device,
    wherein the beam steering device is configured to transmit substantially all power in the amplified signal toward the target, and
    the beam steering device is configured to transmit at least two chopped signals toward different portions of the target.

13. The system of claim 12, wherein the at least two chopped signals include complementary phases and sum to the amplified signal.

14. The system of claim 12, further comprising:
    a second detecting unit configured to detect second radiation from a different portion of the target than the first radiation and to generate a second detection signal based on the predetermined frequency of the beam steering device.

15. The system of claim 14, wherein the second detecting unit comprises:
    a second detector configured to detect the second radiation and output a second signal; and
    a second lock-in amplifier configured to process the second signal using a signal from the beam steering device that corresponds to the predetermined frequency.

16. The system of claim 12, wherein the first detecting unit comprises:
    a detector configured to detect the first radiation from a first portion of the target and output a first signal; and
    a lock-in amplifier configured to process the first signal using a signal from the beam steering device that corresponds to the predetermined frequency.

17. A method of remotely sensing a target, comprising:
    emitting a beam of optical radiation from a source disposed in an aircraft or satellite;
    steering the beam of optical radiation to transmit at least one chopped signal toward at least one location on the target, the at least one chopped signal including substantially all optical radiation in the beam of optical radiation;
    generating a reference signal corresponding to a frequency of the at least one chopped signal; and
    detecting first radiation from a first chopped signal of the at least one chopped signal using a phase sensitive technique and the reference signal;
    wherein the steering includes:
    alternately deflecting the beam of optical radiation toward first and second locations on the target to respectively generate the first chopped signal and a second chopped signal, and the first and second chopped signals are complementary, out-of-phase with respect to each other.

18. The method of claim 17, further comprising:
    detecting second radiation from the second chopped signal using a phase sensitive technique and the reference signal.

19. The method of claim 18, wherein the phase sensitive technique includes a lock-in technique that uses the reference signal.

20. The method of claim 17, further comprising:
calibrating data provided by said detecting first radiation.

21. A method of remotely sensing a target, comprising:
emitting a beam of optical radiation from a cw source disposed in an aircraft or satellite toward a position on a target;
steering optical radiation reflected from the position on the target to generate a plurality of chopped signals;
generating a reference signal corresponding to a frequency of the plurality of chopped signals;
detecting first radiation from a first chopped signal of the plurality of chopped signals using a phase sensitive technique and the reference signal; and
detecting second radiation from a second chopped signal of the plurality of chopped signals using the phase sensitive technique and the reference signal,
wherein the first and second chopped signals are generated as complementary out-of-phase signals by the steering of the optical radiation reflected from the target.

* * * * *